United States Patent
Bhutani et al.

(10) Patent No.: US 10,477,128 B2
(45) Date of Patent: Nov. 12, 2019

(54) NEIGHBORHOOD HAZE DENSITY ESTIMATION FOR SINGLE-IMAGE DEHAZE

(71) Applicant: Nikon Corporation, Tokyo (JP)

(72) Inventors: Ripul Bhutani, Mountain View, CA (US); Ping-Wei Chang, San Jose, CA (US); Bausan Yuan, San Jose, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 15/865,058

(22) Filed: Jan. 8, 2018

(65) Prior Publication Data

US 2018/0198998 A1 Jul. 12, 2018

Related U.S. Application Data

(60) Provisional application No. 62/443,584, filed on Jan. 6, 2017.

(51) Int. Cl.
| | |
|---|---|
| *H04N 5/365* | (2011.01) |
| *G06T 5/00* | (2006.01) |
| *H04N 9/73* | (2006.01) |
| *H04N 5/232* | (2006.01) |
| *H04N 1/60* | (2006.01) |
| *H04N 5/217* | (2011.01) |
| *H04N 9/64* | (2006.01) |

(52) U.S. Cl.
CPC ........... *H04N 5/3656* (2013.01); *G06T 5/002* (2013.01); *G06T 5/003* (2013.01); *H04N 1/6027* (2013.01); *H04N 5/217* (2013.01); *H04N 5/23293* (2013.01); *H04N 9/646* (2013.01); *H04N 9/735* (2013.01); *G06T 2207/10024* (2013.01); *G06T 2207/20032* (2013.01); *G06T 2207/20036* (2013.01); *G06T 2207/20221* (2013.01); *H04N 1/6005* (2013.01)

(58) Field of Classification Search
CPC .... H04N 5/3656; H04N 5/217; H04N 1/6027; H04N 9/735; H04N 5/23293; H04N 1/6005; G06T 5/002; G06T 2207/20036; G06T 2207/20221; G06T 2207/10024; G06T 2207/20032
See application file for complete search history.

(56) References Cited

U.S. PATENT DOCUMENTS

| | | | | |
|---|---|---|---|---|
| 2009/0123070 A1* | 5/2009 | Xiaoying | ................... | G06T 7/11 382/176 |
| 2015/0071563 A1* | 3/2015 | Park | ........................ | G06T 5/007 382/274 |
| 2017/0316551 A1* | 11/2017 | Hong | ...................... | G06T 5/003 |

OTHER PUBLICATIONS

Gonzalez et al., "Morphological Reconstruction," MATLAB Digest—Academic Edition, 6 pages (2010).

(Continued)

*Primary Examiner* — Yogesh K Aggarwal
(74) *Attorney, Agent, or Firm* — Klarquist Sparkman, LLP

(57) ABSTRACT

Dehazed images are produced based on an atmospheric light image obtained form an input image as brightest pixels of a predetermined window and white map. The white map is median filtered, morphologically filtered and, in some examples, filtered with a guided filter, and the filtered image combined with the atmospheric light image to produce a dehazed image.

26 Claims, 3 Drawing Sheets

(56) References Cited

OTHER PUBLICATIONS

He et al., "Guided Image Filtering," 11th European Conference on Computer Vision, 30 pages (Sep. 2010).
Vincent, "Morphological Grayscale Reconstruction in Image Analysis: Applications and Efficient Algorithms," *IEEE Transactions on Image Processing,* 2:176-201 (Apr. 1993).

* cited by examiner

NEIGHBORHOOD HAZE DENSITY ESTIMATION FOR SINGLE-IMAGE DEHAZE

CROSS REFERENCE TO RELATED APPLICATION

This application claims the benefit of U.S. Provisional Application No. 62/443,584, filed Jan. 6, 2017, which is hereby incorporated by reference in its entirety.

FIELD

The disclosure pertains to image haze removal.

BACKGROUND

Sophisticated imaging systems have become available to photographers of all types. Sensitive, high resolution sensors can be provided in digital single lens reflex cameras, rangefinder cameras, point and shoot cameras, and in mobile phones or other image capture systems. Not only has sophisticated image capture hardware become readily accessible, similarly sophisticated image processing systems and algorithms have been built into image capture devices, or have been provided in image processing programs suitable for amateur photographers and professional photographers alike. For example, single images can be retouched to correct color balance, contrast, or brightness, provide selective blurring, removing artifacts associated with the use of flash such as "red-eye," and multiple images can be combined in numerous ways. Nevertheless, many problems commonly encountered by photographers remain unsolved, or conventional solutions have significant and generally unacceptable defects. For example, conventional methods of removing image haze have a common problem of making foreground objects excessively dark and/or of changing their colors. Image haze is a common image defect, and additional approaches for removing haze are needed.

SUMMARY

Image processors comprise a memory storing processor-executable instructions for a method that includes processing an input image to produce a bright channel image associated with largest brightness values in the input image over a first selected window. The method also includes defining an atmospheric light image corresponding to atmospheric light based on the bright channel image and processing the input image to produce a white map image based on input image brightness and saturation values. A transmission map image is produced based on the white map image, the atmospheric light image, and a haze value h, wherein $0 \le h \le 1$. A dehazed image is determined based on the input image, the transmission map image, and the atmospheric light image. In some examples, the atmospheric light image is obtained by applying a guided filter to the bright channel image, and the guided filter is based on the bright channel image as a guidance image. In some examples, the white map image based on the input image corresponds to $(1-S)/L$ for each pixel, wherein L is a brightness value and S is a saturation value associated with the pixel. According to some embodiments, the transmission map image is based on median filtering the white map image and the atmospheric light image, and the dehazed image is produced as $(J-A)/T+A$, wherein J is the input image, A is the atmospheric light image, and T is the transmission image. In representative examples, the first selected window is a rectangular area between 2 and 200 pixels wide and 2 and 200 pixels high and the median filter is based on a second selected window having a rectangular area between 2 and 200 pixels wide and 2 and 200 pixels high. In some alternatives, the input image is processed to obtain image brightness and saturation values from the input image.

Image processing methods comprise producing a smoothed image and an atmospheric light image based on an input image and dehazing the input image by combining the smoothed image, the atmospheric light image, and the input image. In some examples, the input image is median filtered, wherein the smoothed image is produced by morphologically reconstructing the median filtered input image. In still further examples, the input image is processed to produce a bright channel image, wherein the atmospheric light image is produced by applying a guided filter to the bright channel image. In some specific examples, a basemap image $B=1-W/A$ is produced, wherein W is the smoothed image and A is the atmospheric light image. A transmission map image $T=hB+(1-h)$ is defined, wherein h is a haze factor $0 \le h \le 1$, and the input image is dehazed to produce a dehazed output image as $(J-A)/T+A$. In some examples, the smoothed image W is produced by applying a median filter and morphological reconstruction to the input image. According to other embodiments, the atmospheric light image is produced by processing the input image to produce a bright channel image associated with largest brightness values in the input image over a selected window.

Image acquisition systems comprise an image sensor and a memory coupled to the image sensor so as to store an image. A processor is coupled to the memory so as to retrieve the image and produce a dehazed image based on pixel by pixel processing to produce a first image corresponding to morphologically filtering the input image and a second image corresponding to brightest pixels in the input image over a predetermined window.

The foregoing and other objects, features, and advantages of the disclosure will become more apparent from the following detailed description, which proceeds with reference to the accompanying figures.

DETAILED DESCRIPTION

Figure 1:
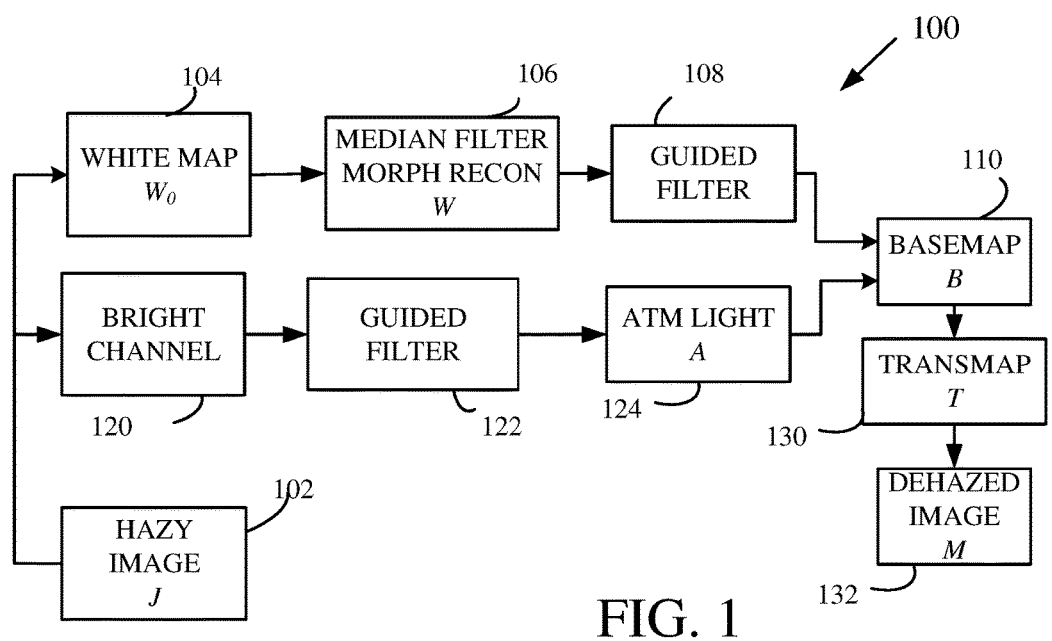
FIG. 1 illustrates a representative method of haze reduction.

Disclosed herein are methods and apparatus that permit haze thickness/density estimation to identify hazy ambient and non-hazy objects in images and apply a non-uniform dehaze correction. Regions with high haze density can be over-corrected, and regions with low haze density under-corrected. Colors can be preserved in non-hazy sections which tends to reveal correct colors behind haze in a foggy image. Brightness/luminance of non-hazy sections need not be reduced. Some dehaze methods attempt to recover lost luminance after removing haze, but full recovery of luminance is tends to be difficult. The disclosed methods can completely avoid the need to recover luminance, reducing computation complexity associated with haze removal.

The systems and methods disclosed herein can be implemented in image capture devices (cameras) or photo editing systems using software that includes processor-executable instructions for a general purpose microprocessors. Alternatively, customized processors can be used such as those based on FPGAs, ASICs, etc.

As used herein, "image" refers to a scene representation that is stored or storable in a computer readable medium such a RAM, ROM, a storage device such as a hard disk, a CD or DVD, a thumbdrive, or in memory in an image capture device or an image editing device. Such images are typically obtained by capturing the scene with a visible, infrared, or other capture device, typically a camera. In some cases, the term "image" may refer to a distribution of electromagnetic radiation at an image plane formed by an imaging lens, but the meaning of "image" will be apparent from its usage and context. Images can be stored in a variety of formats such as RAW, JPEG, TIFF, DNG, PNG, GIF, or others. Stored images represent image picture elements at an array of locations, and generally include image values for a rectangular array of locations. Stored image values can include values associated with red, green, and blue (RGB) image contributions, cyan, blue, and magenta values (CMB), hue, saturation, lightness (brightness) (HSL), hue, saturation, and value (HSV), or other values such as YCbCr or Y'CbCr. For convenient description, images values such as HSL values are referred to in some cases with subscripts that denote a location in an image, typically an image row and column. For example, lightness values at a row i and a column j are denoted $L_{ij}$. As used herein, the term "brightness" refers to an image parameter associated with image lightness, and is not limited to a particular coordinate in a particular image representation. For convenient illustration, images are described in some cases as single channel images, but in general, multi-channel images (such as RGB images) can be processed channel by channel, or one, two, or more channels can be processed and other channels left unaltered or processed based on values obtained in different channels. As used herein, "image" can refer to a single channel of a multi-channel image, or a multi-channel image, as will be clear from the context.

A representative method 100 is illustrated in FIG. 1. At 102, an original image J is received. The original image J can also be referred as a hazy image as it corresponds to an image prior to haze reduction, whether or not haze is present in the image. At 104, the hazy image J is processed to determine a white map $W_0$ based on a brightness component L of the hazy image J and a saturation value S such that the white map $W_0=(1-S)/L$. The brightness component L of the hazy image and the saturation value S define pixel L, S values so that the white map $W_0$ can be determined with pixel by pixel calculation using the associated L, S values. Thus, each pixel of the white map $W_0$ is assigned a value $W_{0ij}=(1-S_{ij})/L_{ij}$, wherein ij denotes a location of the pixel in the image as being in an ith row and a jth column. For hazy image representations in some image formats, the hazy image is first processed to provide the pixel L, S values. Although pixel locations in images are represented herein with as row and column numbers (i, j in the above), pixel locations can be assigned based on a single index, and multiple images and three dimensional images can be processed as well.

The white map $W_0$ is processed with a median filter and morphologically reconstructed at 106 to produce a reconstructed, median filtered image W. The median filter tends to provide smoothing but preserves edges and provides median values associated with the white map $W_0$ over a window. The window can be a linear or two dimensional window, and typically a rectangular window x pixels wide by y pixels high is used, wherein x and y are between 2 and 4, 2 and 10, 2 and 20, 2 and 50, 2 and 100, and 2 and 200. The reconstructed, median filtered image W is then processed with a guided filter at 108 and then used for determining a basemap B at 110. Use of morphological filtering generally provides smoothing, but avoids removal of small image features as well as permitting successful dehazing of image backgrounds enclosed by foreground objects.

The hazy image J is also coupled to a bright channel filter at 120 that selects a brightest pixel, i.e., a pixel with a largest L value within a window about each point, and assigns the associated L values to each point to form a bright channel image. In one example, a 10 pixel by 10 pixel window is situated at each pixel, and a largest L value within the window is assigned as an L value for that pixel of the bright channel image. In some examples, this size of this window is user selectable, but in typical examples a fixed window size of 10 by 10 pixels is satisfactory, but rectangular or square window sizes having lengths and widths of 5, 10, 15, 20, 25, 50, or 100 pixels can be used, or any lengths and widths from 20 to 200 can be used. Other window sizes and shapes can also be used, but selection can depend on avoiding unnatural image colors. The bright channel image can be provided using a morphological image dilation operation using the hazy image and a square kernel, but other kernel shapes can be used such as circles, diamonds, or rectangles. The bright channel image is then filtered with a guided filter at 122 to produce an image referred to for convenience as "atmospheric light" ("AtmLight"). This image can be considered to be associated with light scattered in the atmosphere and incorporated into the original image.

Guided filters such as those used at 108, 122 are described in, for example, He et al., "Guided Image Filtering," European Conf. Computer Vision (2010), which is incorporated herein by reference. Guided filters generate a filtered output image based on an input image and a guidance image, which can be the image to be filtered as well. Guided filters provide edge smoothing but have satisfactory behavior near edges. Guided filters are specified in part by a window radius r. In some examples, the guided filters in the disclosed methods use an input image as a guidance image. For example, the guided filter applied at 122 can use the bright channel image obtained at 120 as the guidance image. Similarly, at 108, the reconstructed, median filtered image W can be used as the guide image.

As used herein, morphological filtering consists of filtering based on a marker image F, a mask image G, and a structuring element E (typically dilation). Marker and mask images can be binary-valued (either 0 or 1) or gray-valued (any value between 0 and 1). The marker image F is a subset of the mask image G, that is, pixel values of the marker image F must be either equal or smaller than mask image G. Such a filtering process modifies the marker image using the information in the structuring element E, constrained by the information in the mask image G, in an iterative process until convergence. During the iterative process, the marker is successively modified (typically dilated) by the structuring element, and subsequently restricted by the mask, until any further iteration no longer modifies the marker image F. The modified marker than becomes the filtered output of the morphological reconstruction. Morphological filtering operations can be implemented using, for example, MATLAB technical computing software that provides a morphologically filtered output image out as out=imreconstruct (marker, mask). Morphological filtering can also be provided in processor specific implementations as may be more convenient for use in image capture devices, or otherwise implemented in image processing tools.

At 110, pixel values for a basemap image B are determined based on corresponding pixel values in the reconstructed, median filtered image W and the image AtmLight as B=1−W/AtmLight, i.e., as $B_{ij}=1-W_{ij}/AtmLight_{ij}$, wherein i, j refer to pixels in an ith row and a jth column. The basemap B is then used to determine an estimated transmission map ("TransMap") T at 130, wherein T=h·B+(1−h), wherein h is a haze value (0≤h≤1). TransMap T includes corrections based on intensity values only (via white map $W_0$) and local corrections based on nearby pixels (via the bright channel image obtained at 120). At 132, a dehazed image $M_0$ is produced as M=(J−A)/T+A.

In the example of FIG. 1, only the haze value h is provided as a user-adjustable parameter, but in other examples, additional user-adjustable parameters can be provided. For example, images can be processed based on a user-selectable gamma correction value γ such that $L=L^\gamma$, and a scaling factor for L values wherein L=αL. In other examples, image portions that appear too bright or too dark can be processed so as to adjust image RGB values. As discussed above, image windows associated with some image transformations can be square, rectangular, circular or other shapes of a wide range of sizes.

Figure 2:
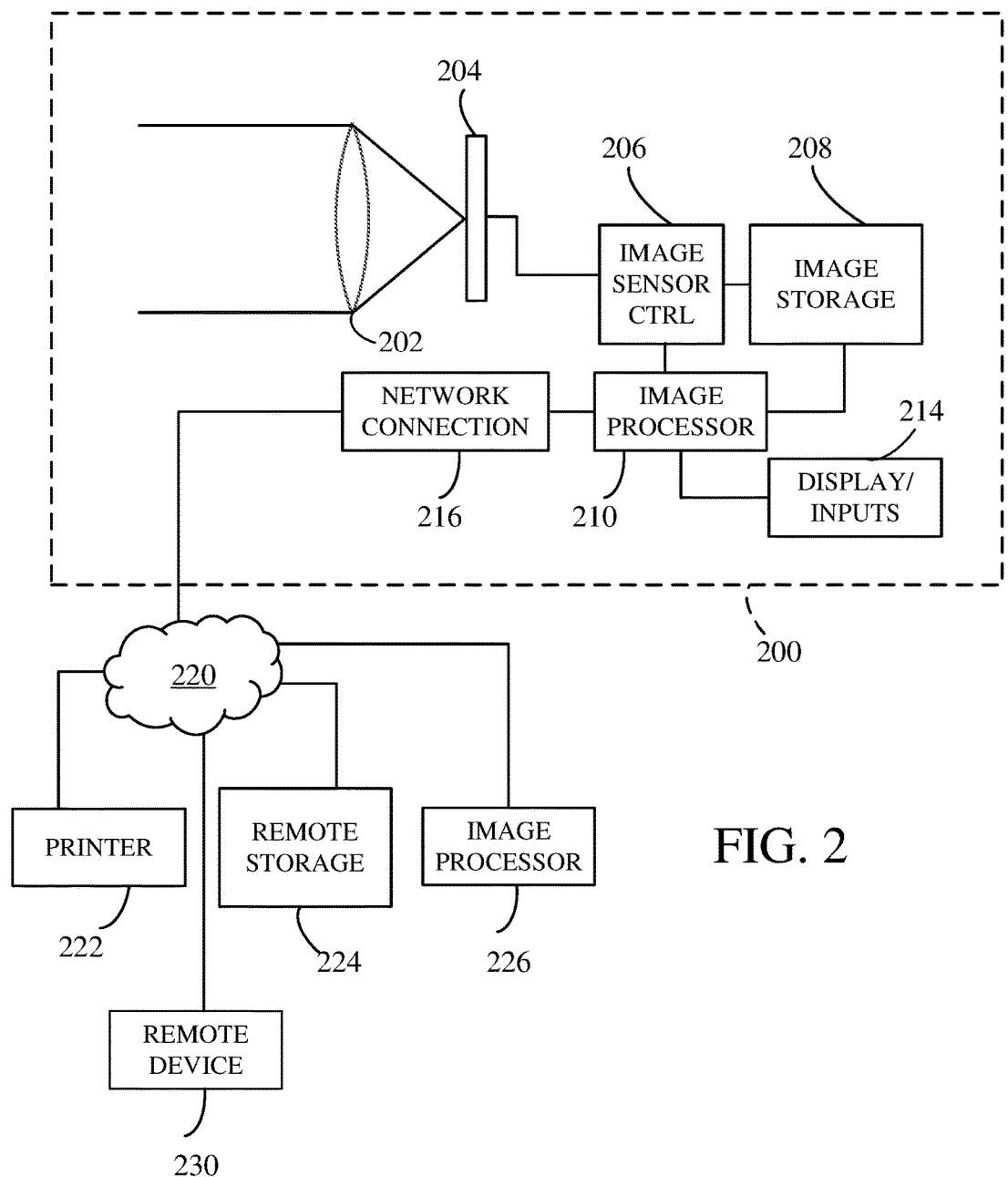
FIG. 2 illustrates a representative image acquisition system that provides image capture and haze reduction.

With reference to FIG. 2, a representative camera 200 includes a lens 202 situated to form an image of an object or scene at an image sensor 204, typically a sensor array containing a plurality of sensor elements. An image sensor controller is coupled to the image sensor 204 to provide any necessary sensor bias and to read-out signals from each of the sensor elements so as to provide an image that can be stored in a memory device 208. An image processor 210 is coupled to the memory device so that the image processor 210 can retrieve images from the memory device 208, and process the image to reduce haze as discussed above using processor-executable instructions that are stored in a memory. User input/output devices 214 such as displays, touch panels, and pointing devices are coupled to permit control of image acquisition and processing, and can be used to select any parameters necessary for image processing such as for haze reduction. A network connection 216 such as a wired or wireless connection is coupled to the image processor 210 and communicates images (with or without processing), image processing parameters, and other image information via a wide area network 220. Images can then be stored in a remote storage 224, processed by a remote image processor 226, and printed at a remote printer 222. Remote storage, processing, printing, and other activities can be requested by one or more remote devices 230, such as mobile phones, laptop computers, tablets, or other devices.

Figure 3:
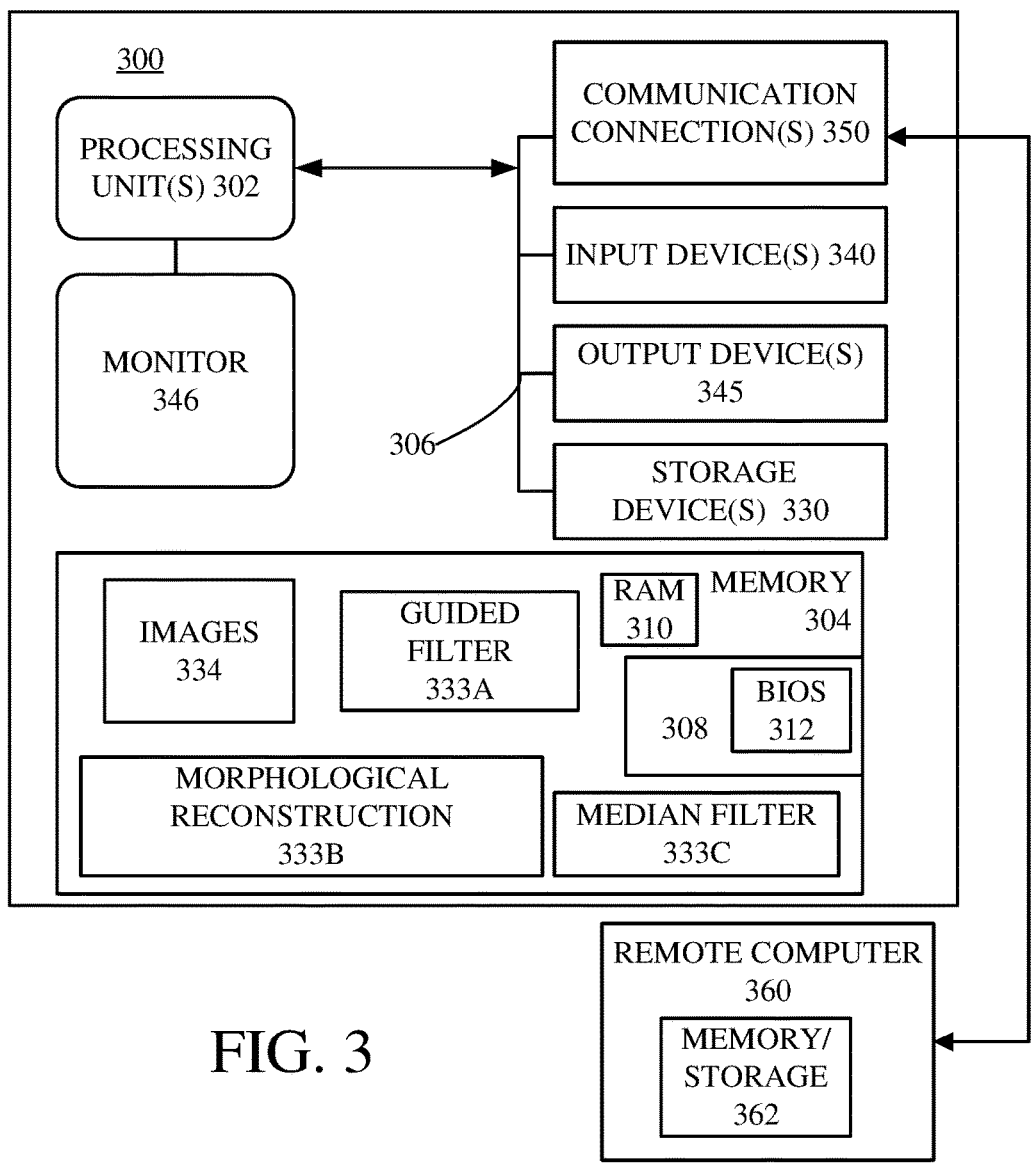
FIG. 3 illustrates a representative computing environment for performing image processing methods.

FIG. 3 and the following discussion are intended to provide a brief, general description of an exemplary computing environment in which the disclosed image processing methods may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the disclosed technology includes a general purpose computing device in the form of an exemplary conventional PC 300, including one or more processing units 302, a system memory 304, and a system bus 306 that couples various system components including the system memory 304 to the one or more processing units 302. The system bus 306 may be any of several types of bus structures including a memory bus or memory controller, a peripheral bus, and a local bus using any of a variety of bus architectures. The exemplary system memory 304 includes read only memory (ROM) 308 and random access memory (RAM) 310. A basic input/output system (BIOS) 312, containing the basic routines that help with the transfer of information between elements within the PC 300, is stored in ROM 308.

The exemplary PC 300 further includes one or more storage devices 330 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 306 by a hard disk drive interface, a magnetic disk drive interface, and an optical drive interface, respectively. The drives and their associated computer readable media provide nonvolatile storage of computer-readable instructions, data structures, program modules, and other data for the PC 300. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 330 including an operating system, one or more application programs, other program modules, and program data. A user may enter commands and information into the PC 300 through one or more input devices 340 such as a keyboard and a pointing device such as a mouse. Other input devices may include a digital camera, microphone, joystick, game pad, satellite dish, scanner, or the like. These and other input devices are often connected to the one or more processing units 302 through a serial port interface that is coupled to the system bus 306, but may be connected by other interfaces such as a parallel port, game port, or universal serial bus (USB). A monitor 346 or other type of display device is also connected to the system bus 306 via an interface, such as a video adapter. Other peripheral output devices, such as speakers and printers (not shown), may be included.

The PC 300 may operate in a networked environment using logical connections to one or more remote computers, such as a remote computer 360. In some examples, one or more network or communication connections 350 are included. The remote computer 360 may be another PC, a server, a router, a network PC, or a peer device or other common network node, and typically includes many or all of the elements described above relative to the PC 300, although only a memory storage device 362 has been illustrated in FIG. 3. The personal computer 300 and/or the remote computer 360 can be connected to a logical a local area network (LAN) and a wide area network (WAN). Such networking environments are commonplace in offices, enterprise wide computer networks, intranets, and the Internet.

When used in a LAN networking environment, the PC 300 is connected to the LAN through a network interface. When used in a WAN networking environment, the PC 300 typically includes a modem, a wireless transceiver, or other means for establishing communications over the WAN, such as the Internet. In a networked environment, program modules depicted relative to the personal computer 300, or portions thereof, may be stored in the remote memory storage device or other locations on the LAN or WAN. The network connections shown are exemplary, and other means of establishing a communications link between the computers may be used.

As shown in FIG. 3, the memory 304 stores processor executable instructions for various image processing procedures. For example, processor instructions for a guided filter, morphological reconstruction, and median filtering are stored in respective memory portions 333A, 333B, 333C, and image data, including input images, output images, and any intermediate image data can be stored in a memory portion 334. In some cases, processor executable instructions for such procedures are stored in remote memory such as the remote memory 362. Image processing (for example, haze reduction or any steps in haze reduction) can be executed at one or more remote computers.

Having described and illustrated the principles of the disclosed technology with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which the principles of the disclosure may be applied, it should be recognized that the illustrated embodiments are examples and should not be taken as a limitation on the scope of the disclosure. For instance, various components of systems and tools described herein may be combined in function and use. We claim as our invention all subject matter that comes within the scope and spirit of the appended claims. Alternatives specifically addressed in these sections are merely exemplary and do not constitute all possible alternatives to the embodiments described herein.

We claim:

1. An image processor, comprising a memory storing processor-executable instructions for a method comprising:
   processing an input image to produce a bright channel image associated with largest brightness values in the input image over a first selected window;
   defining an atmospheric light image corresponding to atmospheric light based on the bright channel image;
   processing the input image to produce a white map image based on input image brightness and saturation values;
   producing a transmission map image based on the white map image, the atmospheric light image, and a haze value h, wherein $0 \leq h \leq 1$; and
   determining a dehazed image based on the input image, the transmission map image, and the atmospheric light image.

2. The image processor of claim 1, wherein the method further comprises obtaining the atmospheric light image by applying a guided filter to the bright channel image.

3. The image processor of claim 2, wherein the guided filter is based on the bright channel image as a guidance image.

4. The image processor of claim 2, wherein the white map image based on the input image corresponds to $(1-S)/L$ for each pixel, wherein L is a brightness value and S is a saturation value associated with the pixel.

5. The image processor of claim 1, wherein the transmission map image is based on a median filtered, morphologically reconstructed white map image.

6. The image processor of claim 1, wherein the transmission map image is based on a median filtered, morphologically reconstructed, and guided filtered white map image.

7. The image processor of claim 1, wherein the dehazed image is produced as $(J-A)/T+A$, wherein J is the input image, A is the atmospheric light image, and T is the transmission image.

8. The image processor of claim 1, wherein the first selected window is a rectangular area between 2 and 200 pixels wide and 2 and 200 pixels high.

9. The image processor of claim 5, wherein the median filter is based on a second selected window having a rectangular area between 2 and 200 pixels wide and 2 and 200 pixels high.

10. The image processor of claim 9, wherein the first window is 10 pixels wide.

11. The image processor of claim 1, further comprising processing the input image to obtain image brightness and saturation values from the input image.

12. The image processor of claim 1, further comprising displaying the dehazed image.

13. An image processing method, comprising:
    with a processor,
    producing a smoothed image and an atmospheric light image based on an input image wherein the atmospheric light image is produced by processing the input image to produce a bright channel image associated with largest brightness values in the input image in associated windows, each of the associated windows having a common size; and
    dehazing the input image by combining the smoothed image, the atmospheric light image, and the input image.

14. The image processing method of claim 13, further comprising median filtering the input image, wherein the smoothed image is produced by morphologically reconstructing the median filtered input image.

15. An image processing method, comprising:
    with a processor,
    processing the input image to produce a bright channel image;
    producing a smoothed image and an atmospheric light image based on the input image; and
    dehazing the input image by combining the smoothed image, the atmospheric light image, and the input image, wherein the atmospheric light image is produced by applying a guided filter to the bright channel image.

16. The image processing method of claim 15, further comprising:
    producing a basemap image $B=1-W/A$, wherein W is the smoothed image and A is the atmospheric light image; and
    defining a transmission map image $T=hB+(1-h)$, wherein h is a haze factor $0 \leq h \leq 1$, and the input image is dehazed to produce a dehazed output image as $(J-A)/T+A$, wherein J is the input image.

17. The image processing method of claim 15, further wherein the input image is dehazed to produce a dehazed output image as $(J-A)/T+A$, wherein $T=hB+(1-h)$, h is a haze factor $0 \leq h \leq 1$, $B=1-W/A$, W is the smoothed image, J is the input image, and A is the atmospheric light image.

18. The image processing method of claim 17, wherein the smoothed image W is produced by applying a median filter and morphological reconstruction to the input image.

19. The image processing method of claim 18, wherein the atmospheric light image is produced by processing the input image to produce a bright channel image associated with largest brightness values in the input image over a selected window.

20. The image processing method of claim 18, wherein the input image, the bright channel image, the atmospheric light image, the smoothed image, the basemap image, and the transmission map image are three channel images, wherein each channel of the bright channel image is associated with a largest brightness value in the input image in the corresponding channel.

21. The image processing method of claim 20, wherein the input image, the bright channel image, the atmospheric light image, the smoothed image, the basemap image, and the transmission map image are RGB images.

22. The method of claim 15, wherein the smoothed image is produced by sequentially applying a median filter, a morphological filter, and a guided filter to the input image.

23. The image processing method of claim 15, further comprising median filtering the input image, wherein the smoothed image is produced by morphologically reconstructing the median filtered input image.

24. An image acquisition system, comprising:
an image sensor;
memory coupled to the image sensor so as to store an image; and
a processor coupled to the memory so as to retrieve the image and produce a dehazed image based on pixel by pixel processing that produces a first image corresponding to morphologically filtering the input image and a second image corresponding to brightest pixels in the image over a predetermined window.

25. The image acquisition system of claim 24, wherein the processor is coupled to produce an atmospheric light image based on the second image, and produce the dehazed image based on the morphologically filtered input image and the atmospheric light image.

26. The image acquisition system of claim 25, wherein the atmospheric light image is produced by applying a guided filter to second image.

* * * * *